May 10, 1932.  B. FORD ET AL  1,857,591
STORAGE BATTERY
Filed June 18, 1925   2 Sheets-Sheet 1

WITNESS:

INVENTORS
Bruce Ford and
Walter H. Bancroft.
BY
Augustus B. Stoughton
ATTORNEY.

May 10, 1932.  B. FORD ET AL  1,857,591
STORAGE BATTERY
Filed June 18, 1925   2 Sheets-Sheet 2

WITNESS:

INVENTORS
Bruce Ford and
Walter H. Bancroft
BY
Augustus B. Stoughton
ATTORNEY.

Patented May 10, 1932

1,857,591

UNITED STATES PATENT OFFICE

BRUCE FORD, OF PHILADELPHIA, AND WALTER H. BANCROFT, OF BRYN ATHYN, PENNSYLVANIA

STORAGE BATTERY

Application filed June 18, 1925. Serial No. 37,948.

The present invention relates to so-called alkaline batteries in which the positive pole plate includes, for example, nickel hydroxide, and in which the negative pole plate includes, for example, iron oxide and in which the electrolyte is an alkaline solution, for example caustic potash.

The principal objects of the present invention are, first, to provide a battery of comparatively prolonged life and of increased capacity; second, to simplify and improve features of construction, arrangement and combination of parts; third, to provide plates that can be expeditiously, satisfactorily and comparatively easily manufactured; and fourth, to improve the conductivity of the plates.

To these and other ends hereinafter set forth the invention comprises the improvements to be presently described and finally claimed.

In the following description reference will be made to the accompanying drawings forming part hereof and in which Figure 1 is an elevational view of a plate or electrode embodying features of the invention.

Fig. 6 being a top view, Fig. 7 a side view, and Fig. 8 an end view.

A description will be given of one of the units employed in making the plates or electrodes, and since all of the units with the exception of the active material employed are alike, that description will be sufficient.

Figure 3:
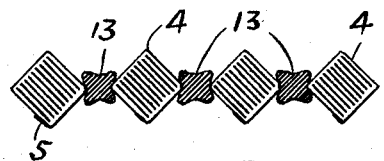
Fig. 3 is a sectional view taken on the line 3—3 of Fig. 1.
Figure 2:
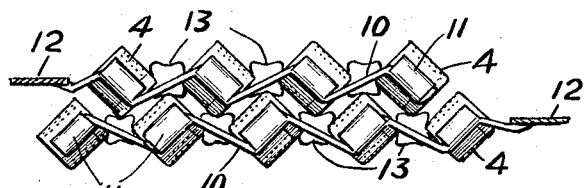
Fig. 2 is a top or plan view of a pair of plates or electrodes embodying features of the invention and which may be considered to be of opposite sign and in operative relation.
Figure 1:
Figure 1:
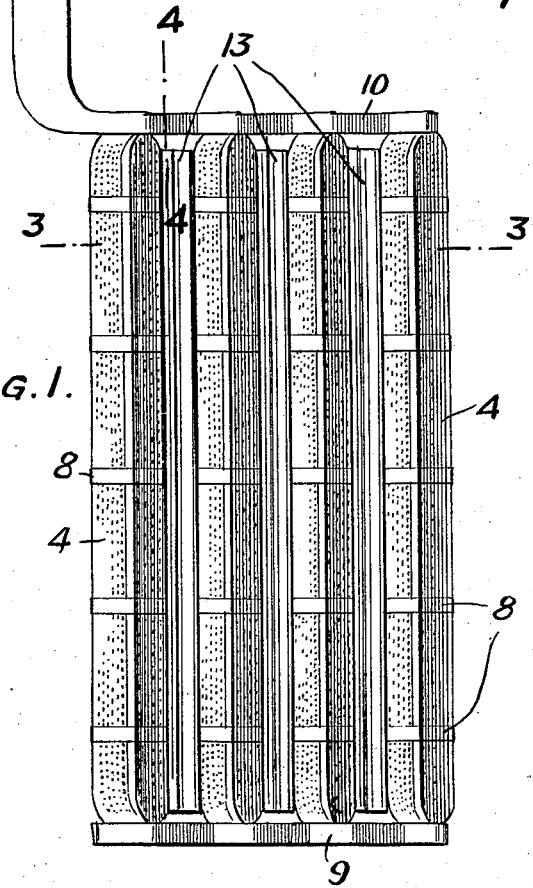
Figure 4:
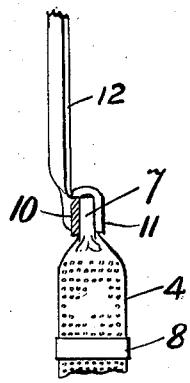
Fig. 4 is a sectional view taken on the line 4—4 of Fig. 1.
Figure 6:
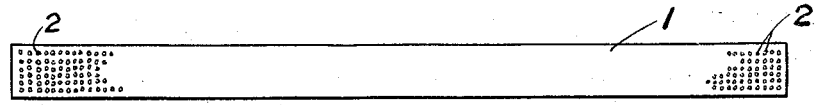
Figs. 6, 7 and 8 are views illustrative of the internal construction of a unit.
Figure 7:
Figure 8:
Figure 9:
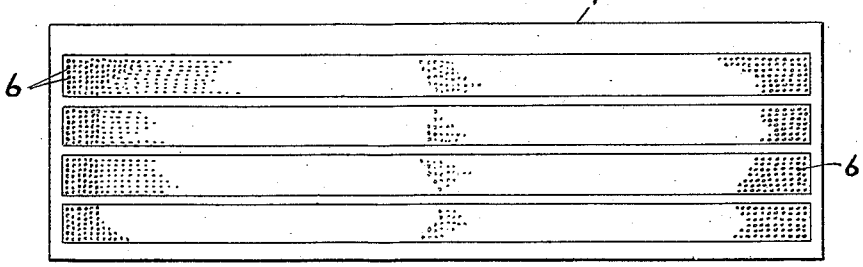
Fig. 9 is a plan view of the envelope or tube blank.
Figure 10:
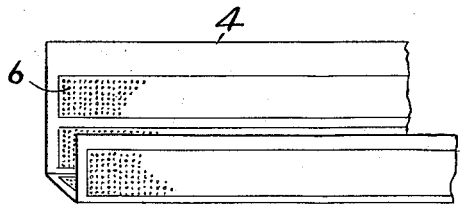
Fig. 10 is a view of the same partially folded.
Figure 12:
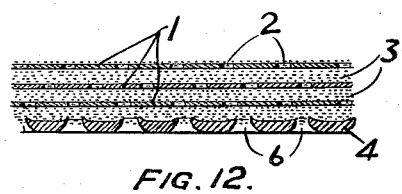
Fig. 12 is an enlarged sectional view showing the employment of different kinds of openings in different parts of the unit.
Figure 11:
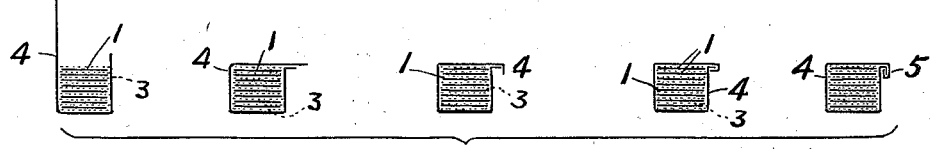
Fig. 11 is a view illustrating in section the folding steps of the tube around its contents.
Figure 5:
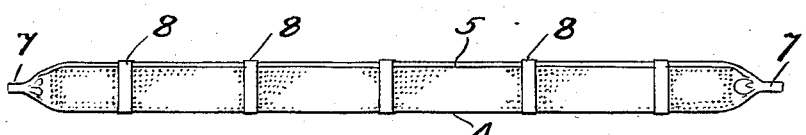
Fig. 5 is a side view of one of the units of the plate or electrode.

1 are foraminous strips, and some idea of their size may be suggested by stating that the drawings are made to a somewhat enlarged scale from commercial plates or electrodes. By way of explanation it may be said that these strips may consist of nickel, Monel metal or of steel nickel plated. Referring to Fig. 12, the holes 2 in the strips 1 are shown as punched or made by the removal of metal. The strips 1 are assembled in flatwise confronting relation and active material or material to become active 3 is applied to and between them. As indicated at the beginning of this description the substance chosen for the active material is appropriate for the particular plate being manufactured whether positive or negative. The active material or material to become active 3 more or less interlocks with the strips through the openings 2, and the active material or material to become active does not extend to the ends of the strips but stops short of the ends as indicated in Fig. 7. The described assemblage of strips and active material may be made by dusting the active material or material to become active onto one strip and then a second strip may be laid upon the first strip and similarly dusted, and so on until the assemblage is complete, and pressure or consolidation may well be applied. The dusting may be confined to the middle parts of the strips, or it may be continued to the ends and in the latter case the end portions of the unit may be freed from active material or material to become active, for example, as set forth in companion Patent to W. H. Bancroft, Serial No. 1,585,521. The assemblage of strips and active material or material to become active is placed in an envelope or tube 4, which may be of the same or similar metals employed in making the strips. As shown the envelope provides foraminous portions or panels surrounded by imperforate portions. The envelope 4 is folded around the described assemblage, for example, as indicated in Fig. 11, with the result that it is rectangular in cross-section and is secured by a lock fold 5. The holes 6 in the envelope may be punched without the removal of metal leaving a kind of burr which, facing the active material, tends to retain it. It will of course be understood that in the assemblage the parts are subject to consolidation and pressure. At the ends 7 the unit is pinched, Fig. 5, and in this way the end portions of the strips and the end portions of the envelope are brought into intimate association preventing material from working out of the units. If desired bands 8 encircling the unit may be provided. The pinched ends 7 of the unit afford a means by which the end terminals 9 and 10 may be secured to them providing definite contact throughout the unit as a path for current. The terminals are of zigzag form and are provided with tabs 11 by which they are clamped to the ends 7. 12 is a terminal post connected with the terminal 10. 13 are insulators as of rubber or rubber material as they are shown as of quatrefoil form in cross-section. One advantage of this is that an imperforate corner of each of the adjacent units makes practically line contact with the insulator thus exposing substantially all of the faces of the adjacent units for the occurrence of battery action or the passage of current. The described shape of the insulators 13 also permits of their being held so as in effect to be unitary parts of the plate or electrode. There is an advantage in making the adjacent plates "rights" and "lefts", as indicated in Fig. 2, because in that way the terminal strips are kept well apart. Reference to Fig. 2 shows that the assemblage is very compact whilst the active surface is practically all available.

As described the strips are coterminous with the wall of the envelope and pinched into contact with the ends thereof, and the strips extend clear across the envelope or are of the width of the interior of the envelope and contact with the wall thereof and at the opposite sides of the envelope.

In the following claims the term active material is intended to include material which becomes active upon the operation of the storage battery.

It will be obvious to those skilled in the art to which the invention relates that modifications may be made in details of construction and arrangement of parts without departing from the spirit of the invention which is not limited to such matters or otherwise than as the prior art and the appended claims may require.

We claim:

1. An alkaline storage battery plate or electrode including a unit comprising a rectangular perforated metallic envelope having internal burrs at the perforations, foraminous metal strips having smooth faces arranged in confronting relation and coterminous with the envelope, and active material applied to and between the middle portions of said strips leaving the ends bare, and the bare ends of the strips and wall of the envelope being pinched together, substantially as described.

2. A storage battery electrode comprising a plurality of similar tubular units of approximately square cross section, each unit having an envelope formed of a single metallic sheet folded into tubular form with a single lock seam at one edge, perforated throughout the four faces but imperforate along the edges, said envelope enclosing foraminous metallic strips in confronting relation and extending substantially across the interior of the envelope and axially coterminous with it, active material disposed between the strips and the envelope except at the ends thereof, and the ends of the strips and envelope pinched together.

3. A storage battery electrode comprising a plurality of similar tubular units of approximately square cross section, each unit having an envelope formed of a single metallic sheet folded into tubular form with a single lock seam at one edge, perforated throughout the four faces but imperforate along the edges, said envelope enclosing foraminous metallic strips in confronting relation and extending substantially across the interior of the envelope and axially coterminous with it, active material disposed between the strips and the envelope except at the ends thereof, and the ends of the strips and envelope pinched together and a plurality of bands encircling each of said tubular units.

BRUCE FORD.
WALTER H. BANCROFT.